INVENTORS.
DANIEL M. FLYNN
STANLEY J. BANDOSKI JR.
WILLIAM R. CLOW

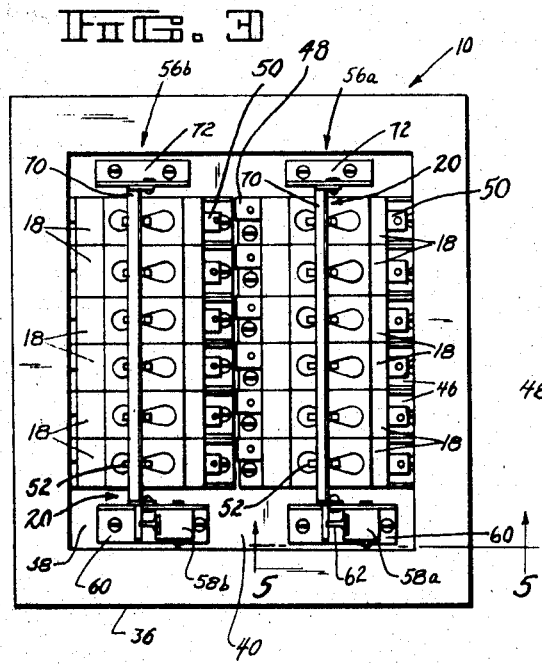
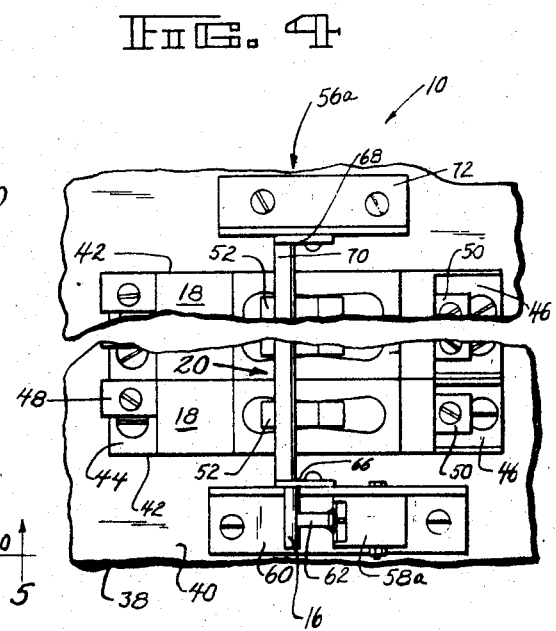
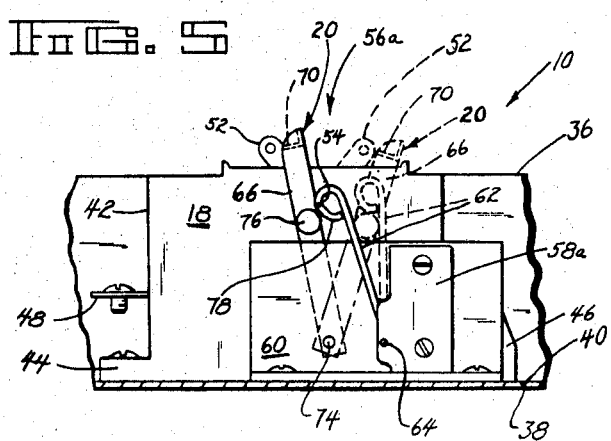

United States Patent Office 3,473,041
Patented Oct. 14, 1969

3,473,041
STANDBY ELECTRICAL SYSTEM AND MEANS FOR DETECTING DEFECTS THEREIN
Daniel M. Flynn, Hampden, Stanley T. Bandoski, Jr., Springfield, and William R. Clow, Agawam, Mass., assignors to Hampden Engineering Company, East Longmeadow, Mass., a corporation of Massachusetts
Filed Oct. 10, 1966, Ser. No. 585,675
Int. Cl. H02j 9/00
U.S. Cl. 307—64                           14 Claims

ABSTRACT OF THE DISCLOSURE

A standby electrical system for distributing electrical energy from an auxiliary power source to a plurality of emergency circuits including an electrical distribution panel having a plurality of circuit breakers, each circuit breaker being electrically connected to an associated branch of the system. An actuating bar mounted on the panel moves in response to the operation of any one of the circuit breakers to activate a signal circuit to indicate the occurrence of a defect in the standby system.

---

This invention relates to improvements in standby or emergency electrical systems and deals more particularly with improvements in systems of a type including means for detecting and indicating defects therein.

Heretofore, emergency or standby electrical systems have been provided utilizing fuses of the signal or indicating type to detect defects in standby circuits and to complete signal circuits to indicate fuse failures. Such signal fuses usually house a link designed to melt or fuse when carrying an abnormal current load and include a spring-loaded pin adapted to extend from the fuse when the link fails. The pin serves to bridge a gap between the fuse and a buss or contact bar and to establish a circuit path through a portion of the fuse to the contact bar.

A system of the aforedescribed type is shown in Patent No. 2,804,554 to Ippolito, issued Aug. 27, 1957 and entitled "Emergency Standby Electric Service Apparatus." Such apparatus relies upon a blown-out fuse to establish an electrical contact and to provide an electrical circuit path to an associated signal circuit electrically connected with at least a portion of the standby circuit. Inherent and serious disadvantages of such systems reside in the electrical interconnection of the signal and standby circuits and in the utilization of electrical contacts atmospherically exposed during long periods of nonuse which tend to substantially reduce the required reliability of the system. Further disadvantages are encountered in the utilization of open or live fuse panel construction and in the necessity of fuse replacement upon the occurrence of a defect in the systems.

Accordingly, the general object of the invention is to provide an improved standby electrical system wherein a means is provided for detecting and signaling the occurrence of defects therein while the system is in a standby condition and while the system is operating.

Another object of the invention is to provide a novel electrical distribution panel for a standby electrical system to distribute electrical energy from an auxiliary power source to a plurality of emergency circuits and to provide supervision of the emergency circuits to detect and signal the occurrence of predetermined conditions therein.

A further object of the invention is to provide a standby electrical system wherein a signal circuit electrically isolated from the standby system is mechanically actuated upon the occurrence of a defect in the standby system.

Still another object of the invention is to provide a standby electrical system of the aforedescribed character wherein all electrical contacts are of an enclosed type to eliminate or at least substantially reduce the probability of contact failure due to dust, corosion, atmospheric contamination and the like.

A still further object of the invention is to provide an emergency electrical system as aforedescribed which may be rapidly and conveniently restored to a serviceable condition after correction of a defect therein without the necessity of replacing additional parts of the system.

Other objects and advantages of the invention will be apparent from the following description and from the drawings forming a part thereof.

The drawings show preferred embodiments of the invention and such embodiments will be described, but it will be understood that various changes may be made from the constructions disclosed and that the drawings and description are not to be construed as defining or limiting the scope of the invention, the claims forming a part of this specification being relied upon for that purpose.

Of the drawings:

FIG. 3 is a front view of an electrical distribution panel made in accordance with the present invention.

FIG. 4 is a somewhat enlarged fragmentary front view of the electrical distribution panel shown in FIG. 3.

FIG. 5 is a fragmentary side elevational view of the electrical distribution panel of FIG. 3.

Figure 1:
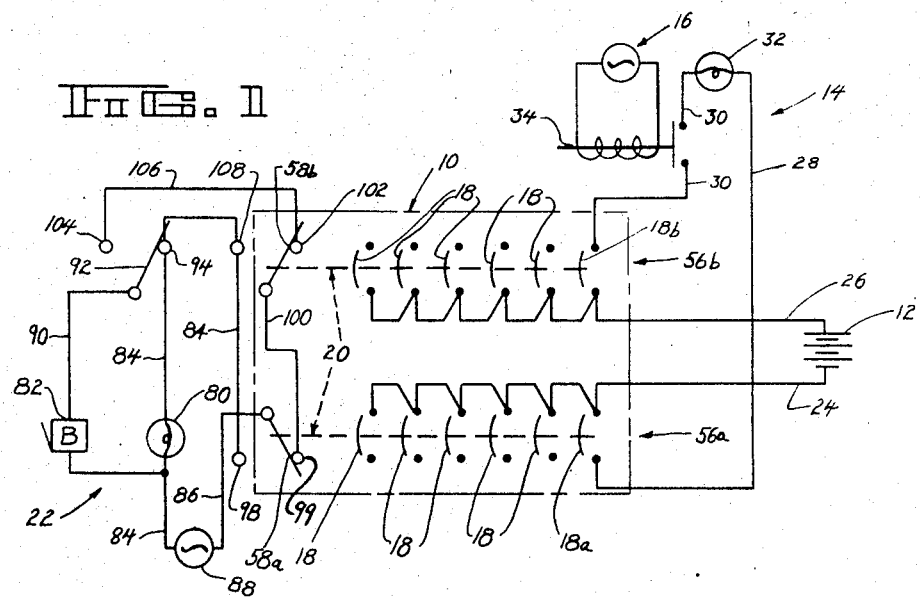
FIG. 1 is a schematic circuit diagram of an improved standby electrical system embodying the present invention.

A simple standby electrical system or emergency lighting system embodying the present invention is illustrated in FIG. 1 and comprises an electrical distribution panel indicated generally by the numeral 10 receiving electrical energy from an auxiliary power source 12 and adapted to supply electrical energy to a typical standby electrical circuit indicated generally at 14 upon failure of a primary power source generally indicated at 16.

The distribution panel 10 is provided with one or more circuit breakers 18, 18 for interrupting the standby circuit 14 upon the occurrence of a predetermined condition therein. Also included on the panel is a mechanical means indicated generally at 20 which cooperates with a circuit breaker 18 to activate a signal circuit 22 which indicates the occurrence of the aforesaid condition.

Auxiliary power sources of various types may be utilized in practicing the invention, however, in the illustrated embodiment the auxiliary power source 12 comprises a twenty-seven cell rechargeable storage battery of the type commonly employed as a power source in emergency lighting systems. At its output side the battery 12 is connected to the distribution point 10 by conductors 24 and 26.

The invention may be practiced with one or more standby circuits. The standby circuit 14 shown in FIG. 1 comprises conductors 28 and 30 providing connection between the distribution panel 10 and a load schematically indicated at 32 and representing emergency lights and other electrical devices comprising an emergency lighting system. The conductors 28 and 30 are respectively connected to the conductors 24 and 26 through the distribution panel 10 in a manner to be hereinafter further described.

Various means may be provided to connect the standby circuit 14 with the auxiliary power source 12 on the occurrence of a failure or malfunction in the primary power source 16. In accordance with conventional practices an electro-mechanical device or relay switch 34 is shown to be electrically connected with the primary power source 16 for maintaining an open circuit condition in the conductor 30 when the primary source 16 is functioning in a normal manner. The relay switch 34 serves to close the circuit through the conductor 30 upon failure or malfunction of the primary power source 16 to connect the load 32 to the auxiliary power source 12.

Important features of the invention reside in the construction and arrangement of the distribution panel 10 and for a detailed description of this part of the apparatus reference is made to FIGS. 3–5.

The distribution panel may take various forms but preferably and as shown the panel 10 comprises a panel box 36 which includes a mounting frame 38 having a substantially flat generally outwardly facing mounting surface 40 upon which the circuit breakers 18, 18 and associated parts of the apparatus are supported. Preferably the panel box also includes a cover plate (not shown) which provides a substantial closure for the box to prevent accidental contact with exposed live electrical connections therein.

Circuit breakers of various types may be used in practicing the invention, however, preferably a conventional type of breaker is employed which is responsive to either a gradual or a surge overload condition in an associated circuit. Each circuit breaker has a movable part or trip device 20 which cooperates with an associated switch in the signal circuit 22 in a manner which will be hereinafter evident.

Further considering the circuit breakers 18, 18 it will be noted that each breaker has a relatively narrow elongated generally rectangular case 42 which houses electrical contacts (not shown) and includes a substantially flat base or bottom surface which supports the device in an upstanding position on the mounting surface 40. Base flanges 44 and 46 project generally longitudinally outwardly from opposite ends of the case 42 to accommodate mounting screws securing the circuit breaker 18 to the frame 38. To facilitate electrical connection with the aforementioned electrical contacts in the case 42 electrical terminals 48 and 50 project longitudinally outwardly from opposite ends of the case.

Each circuit breaker 18 is further provided with a trip device or handle 52 which projects generally outwardly from the top surface of the case 40. The handle 52 is supported for angular movement relative to the case about a laterally extending pivotal axis 54 and is movable between a closed circuit position indicated by full lines in FIGS. 3–5 and an open circuit position shown in broken lines in FIG. 5.

When the handle 52 is in the closed circuit position it is normally biased to the latter position and is movable to its open circuit position in response to the occurrence of a predetermined condition such as an overload in an associated circuit caused by an electrical short in the circuit. It should also be noted that the handle 52 is manually movable between the closed and open circuit positions. Consequently, it will be apparent that each circuit breaker 18 may also serve as a manually operated switch for interrupting an associated circuit.

As previously noted the invention may be practiced with one or more circuit breakers, the number of breakers provided being determined by the number of stand-by circuits that the system is to accommodate. For a reason that will be hereinafter evident two circuit breakers are preferably associated with each standby circuit in the system.

The illustrated distribution panel 10 is arranged to accommodate six standby electrical circuits and for this reason twelve circuit breakers 18, 18 are provided. Preferably the breakers are arranged in two rows or banks indicated generally at 56a and 56b as shown in FIG. 3. The circuit breakers in each bank are further arranged in side-by-side relationship with the handles 52, 52 thereof generally coaxially aligned. Each circuit breaker in the bank 56a is substantially longitudinally aligned with an associated circuit breaker 18 in the bank 56b to provide generally symmetrical panel arrangement.

The conductor 24 is electrically connected to all of the circuit breakers in the bank 56a whereas all of the circuit breakers in the bank 56b are similarly connected to the conductor 26. Electrical connection between the conductor 24 and the conductor 28 is made through a circuit breaker 18a indicated in FIG. 1. Similarly, connection between the conductor 26 and the conductor 30 is made through the circuit breaker 18b. Thus, upon the occurrence of a predetermined condition such as a circuit overload in either branch of the standby circuit 14 between the load 32 and the auxiliary power source 12 one or the other of the two circuit breakers 18a and 18b will operate or attain an open circuit position, thereby interrupting the current through the defective circuit.

To provide a means for energizing the signal circuit 22 hereinafter described in response to the operation of a circuit breaker, the panel 10 is provided with at least one switch which is mechanically actuated by operation of one of the aforesaid circuit breakers and which is electrically connected to the signal circuit in a manner that will be hereinafter described.

Switches of various types may be used in practicing the invention. In the presently preferred embodiment two micro-switches 58a and 58b are provided, each switch being respectively associated with one bank of circuit breakers.

Each of the switches 58a and 58b is mounted on an associated angle bracket 60 fastened to the frame 38 proximate one end of an associated bank of circuit breakers and includes an outwardly projecting actuating member or operating lever 62 supported for angular movement about a laterally extending pivotal axis 64 inwardly spaced from the axis 54.

Mechanical means for actuating the aforedescribed switches in response to the operation of a circuit breaker 18 is provided by an associated actuating bar 20 supported in the path of travel of the breaker handles 52, 52 in an associated bank for movement relative to the frame 38.

Preferably and as shown each actuating bar 20 is generally U-shaped and includes inwardly extending end portions 66 and 68 joined together by a laterally disposed central portion or elongated bar 70 to encompass an associated bank of circuit breakers. Each bar 70 lies generally adjacent the breaker handles 52, 52 in an associated bank and in the path of travel thereof when all of the handles are in the closed circuit position. Support for the end portion 66 is provided by the angle bracket 60, the other end portion 68 being supported by a generally similar angle bracket 72 positioned proximate a circuit breaker 18 at the opposite end of the bank.

The end portions 66 and 68 are pivotally connected to the respectively associated angle brackets 60 and 72 for angular movement about a laterally disposed pivotal axis 74 inwardly spaced from the axis 54. Thus, it will be evident that the member 20 is movable from a first or solid line position of FIG. 5 to a second or broken line position thereof in response to the movement of any one of the circuit breakers 18, 18 in the associated bank.

The end portion 66 is provided with a laterally outwardly extending follower or arm 76 which is adapted to engage the switch lever 62. Referring to FIG. 5 it will be apparent that the path of angular movement of the bar 70 about the axis 74 is substantially greater than the corresponding path of movement of the operating lever 62 about the axis 64. To compensate for this angular differential a cam surface 78 is formed on the free end portion of the lever 62 and is adapted to be engaged by the follower 76 to provide a means for actuating the associated switch in response to the movement of the bar 70. Slight initial movement of the bar 70 in a clockwise direction causes the operating lever 62 to move through a full arc of travel from a first circuit or full line position to a second circuit position indicated by broken lines in FIG. 5. The cam surface 78 is so arranged that the operating lever 62 will dwell in its second circuit position to allow the bar 70 to move in a clockwise direction to its second position.

Considering now the signal circuit 20 and referring again to the schematic circuit diagram of FIG. 1, it will be noted that the switches 58a and 58b are connected with an electroresponsive indicating means including both a pilot light 80 and an alarm buzzer 82 which cooperate to indicate various conditions in the system. The signal circuit shown in FIG. 1 operates to provide indication of a defect in the standby system, both while the emergency system is operating and while it is in a stand-by condition. Power for the circuit 22 is received through conductors or lines 84 and 86 connected with the output side of an independent power source 88. It should also be noted that the lines 84 and 86 may be connected to receive power from the primary source 16 in which case the signal circuit will operate to indicate a defect in the standby circuit but only when the said circuit is in a standby condition.

The pilot light 80 is disposed within the line 84 and is arranged for parallel connection with the buzzer 82 by a conductor or line 90 connected to a manually operable switch 92 associated with a contact 94 disposed within the line 84. The switch 58a is connected with the line 86 and has a contact 98 disposed in the line 84 and another contact 99 which is interconnected with the switch 58b by a conductor 100. The switch 58b in turn has a contact 102 connected to a contact 104 on the switch 92 by a conductor 106 and also includes a second contact 108 disposed within the line 84.

When the standby system is in a standby condition or operating normally the circuit breakers 18a and 18b associated with the standby circuit 14 are in a closed circuit position and the switches 58a, 58b and 92 associated with the signal circuit 22 are in the positions shown in FIG. 1. A defect occurring in a branch of the standby circuit 14 causes the circuit breaker associated with that branch to operate to interrupt the circuit 14 and also causes one or the other of the switches 58a and 58b to move from the first circuit position shown in FIG. 1 to a second circuit position in respective association with its other contact 98 or 108.

For example, the occurrence of a defect in the standby circuit branch including the conductor 28 will operate the circuit breaker 18a to cause the switch 58a to move to a position on the contact 98. A closed circuit is thereby established through the conductors 84 and 86 and through the parallel circuit including the pilot light 80 and the buzzer 82 to energize both the pilot light and the buzzer to provide both audible and visible indication of the defective condition.

The buzzer 82 may be silenced by manually moving the switch 92 to the contact position 104, however, the pilot light 80 will remain illuminated while the switch 58a remains in the defect-indicating position. Upon correction of the defect and return of the switch 58a to its normal or first circuit position of FIG. 1 the pilot light 80 is extinguished whereupon a circuit path is established through the two switches 58a and 58b and through the buzzer 80 to provide a further audible signal. Thereafter, the buzzer 80 may be silenced by returning the manually operated switch 92 to its normal or standby position indicated in FIG. 1. It will be apparent that the occurrence of a defect in other standby circuit branch which includes the conductor 30 will cause the circuit breaker 18b to operate to produce a generally similar result.

Figure 2:
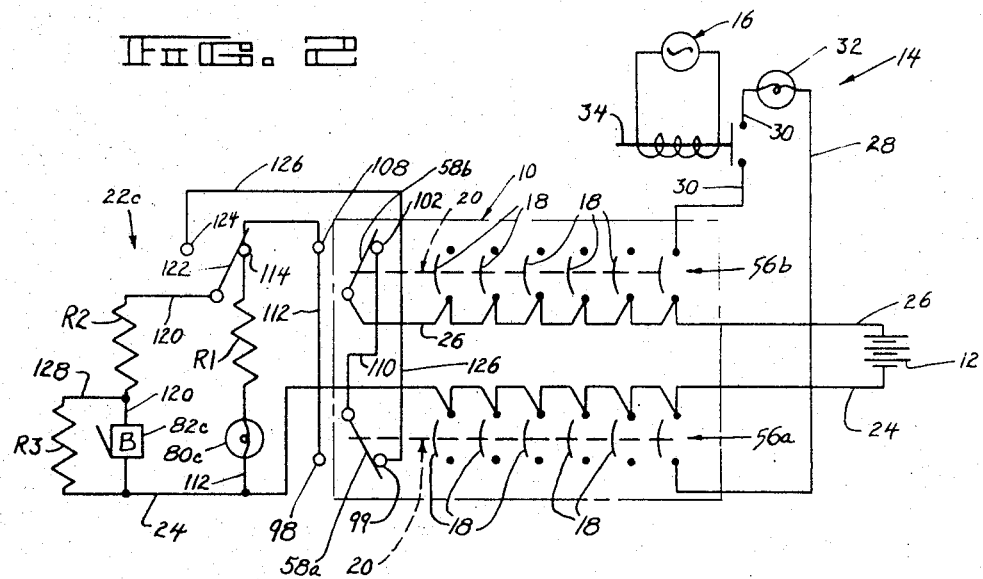
FIG. 2 is a schematic circuit diagram showing a standby electrical system illustrating another embodiment of the invention.

Referring now to the schematic circuit diagram of FIG. 2 another embodiment of the invention is shown which comprises an electrical distribution panel 10 adapted to supply power received from an auxiliary power source 12 to a standby electrical circuit 14 upon failure of a primary power source 16. In the foregoing respects the present embodiment is substantially identical to the embodiment previously described. Components which are substantially identical to those already described with reference to FIG. 1 bear the same reference numeral as the corresponding components of FIG. 1 and will not be hereinafter further described.

The difference in the circuit of FIG. 2 as compared with FIG. 1 resides in the construction and arrangement of the signal circuit generally indicated at 22c and in the connection of the latter circuit with the distribution panel 10.

Specifically, the signal circuit 22c is connected with the auxiliary power source 12 and receives electrical energy through the conductors or lines 24 and 26, the latter line being connected to a switch 58b associated with a bank of circuit breakers indicated at 56b. Another switch 58a located on the panel 10 and associated with a second bank of circuit breakers shown at 56a is connected to a contact 102 on the switch 58b through a line 110. Connected to the line 24 is a conductor or line 112 having disposed therein a visual alarm comprising a pilot light 80c, an associated resistor R1, and contacts 114, 108 and 98, the latter two contacts being respectively associated with the switches 58b and 58a.

Like the signal circuit of the previously described embodiment the present signal circuit 22c includes an audible alarm or buzzer 82c connected with the line 24 by a conductor 120 and in series with a resistor R2 and a manually operated switch 122. In its normal or standby position the switch 122 is associated with the contact 114 to establish a parallel circuit path through the buzzer 82c and the pilot light 80c between the lines 24 and 112. A second contact 124 on the switch 122 is connected to a contact 99 on the switch 58a by a conductor 126. A resistor R3 is disposed within a line 128 which is connected to the line 24 and to the line 112 between the resistor R2 and the buzzer 82c to establish a circuit parallel to the buzzer circuit.

When a defect occurs in the standby circuit 14 either during operation or when the latter circuit is in a standby condition, a circuit breaker associated with the defective branch of the circuit will operate or move to its open circuit position. The associated signal circuit switch 58a or 58b will move to its respective second circuit position to energize the signal circuit. If, for example, a defect in the circuit 14 causes a breaker in the bank 56a to operate, the switch 58a will move to its second circuit position in association with the contact 98 to establish a circuit path from the conductor 26 through the conductor 112 and through the parallel circuit paths including the buzzer 82c and the pilot light 80c to the conductor 24. Thus, the buzzer and the light will be energized simultaneously to provide both audible and visible indication of the defective condition.

The buzzer may be silenced by moving the manual switch 122 to the contact position 124, however, the pilot light 80c will remain illuminated as long as the switch 58a remains in its second circuit position. After the defect has been corrected and the switch 58a has been returned to its normal or first circuit position shown in FIG. 2 the buzzer 82c will again sound to indicate that the manual switch 122 is to be returned to its normal or standby position in association with the contact 114 to restore the system to a standby condition. It will be evident that a substantially identical result will obtain upon operation of the signal circuit switch 58b.

Only one of the circuit breakers 18, 18 in one bank will operate to indicate the occurrence of a defect in a standby circuit. However, as previously indicated each of the circuit breakers on the panel 10 may also serve as a manual switch for interrupting the current to an associated standby circuit. Thus, it will be evident that in addition to serving as a mechanical means for actuating the signal circuit the actuating bar 70 may also serve as a gang reset bar to simultaneously return all the circuit breakers 18, 18 in an associated bank to a closed position when the said circuit breakers are employed as manual switches.

The invention claimed is:
1. In a standby electrical system for replacing a primary electrical system receiving power from a primary source, the combination comprising a plurality of standby electrical circuits, an auxiliary power source, means for connecting said standby circuits to said auxiliary power source upon failure of said primary power source, and an electrical distribution panel including a frame, a plurality of circuit breakers mounted on said frame in at least one bank, each of said circuit breakers being electrically connected to an associated one of said circuits, each of said circuit breakers including a trip device movable relative to said frame between a closed circuit position and an open circuit position, each of said trip devices being normally biased to said closed circuit position and movable to said open circuit position in response to the occurrence of a predetermined condition in an associated one of said circuits, a single switch associated with said one bank mounted on said frame and including an actuating member movable relative to said frame between first and second positions, said member being normally biased to said first position, and a single mechanical means associated with all of said circuit breakers in said one bank for moving said member to said second position in response to the movement of any one of said trip devices in said one bank toward said open circuit position independently of the remainder of said trip devices in said one bank.

2. The combination set forth in claim 1 wherein each of said circuits includes two branches and wherein said circuit breakers are mounted on said frame in two banks, one of said branches of each of said circuits being electrically connected to an associated one of the circuit breakers in one of the said banks and the other of the said branches of each of said circuits being electrically connected to an associated one of the circuit breakers in the other of said banks.

3. The combination as set forth in claim 1 wherein said circuit breakers are arranged in said one bank in side-by-side relationship and wherein said mechanical means comprises an elongated bar extending transversely of the path of travel of each of said trip devices and supported on said frame for movement relative thereto.

4. The combination as set forth in claim 3, wherein said actuating member is a lever pivotally mounted on said switch and in the path of travel of said bar.

5. The combination as set forth in claim 3 including a cam for actuating said switch in response to the movement of said bar.

6. The combination defined in claim 1 wherein said means for connecting said standby circuit is a relay switch electrically connected to said standby circuit and maintained in an open circuit condition by said primary power source when said primary source is functioning in a normal manner.

7. The combination as set forth in claim 1 including a signal circuit electrically connected to said switch and having an electroresponsive indicating means.

8. The combination as set forth in claim 7 wherein said electroresponsive indicating means includes a pilot light, said pilot light being illuminated when said switch member is in said second position.

9. The combination defined in claim 8 wherein said electroresponsive indicating means includes an audible alarm activated by the movement of said switch to said second position.

10. The combination defined in claim 9 wherein said signal circuit includes a manual switch for silencing said alarm.

11. The combination defined in claim 7 wherein said signal circuit is electrically connected with said auxiliary power source.

12. The combination defined in claim 7 wherein said signal circuit is electrically isolated from said standby circuit and said auxiliary power source.

13. The combination as set forth in claim 1 wherein each said trip device comprises a handle which projects outwardly from its circuit breaker and is movable externally thereof selectively under manually exerted pressure and actuation from within the breaker, said latter movement being toward said open circuit position and responsive to an over current condition in its associated circuit.

14. The combination set forth in claim 5 wherein said bar is movable from a first position to a second position in response to the movement of any one of said trip devices toward said open circuit position and said mechanical means includes a follower for engaging said cam to move said actuating member to its second position in response to the movement of said bar toward its second position and to retain said actuating member in its second position during further movement of said bar to its second position and while said bar remains in its second position.

References Cited

UNITED STATES PATENTS

| | | |
|---|---|---|
| 2,656,439 | 10/1953 | Gelzheiser et al. |
| 2,830,194 | 4/1958 | Bembenck _____ 307—64 |
| 3,171,931 | 3/1965 | Powell. |

ROBERT K. SCHAEFER, Primary Examiner

H. J. HOHAUSER, Assistant Examiner

U.S. Cl. X.R.

200—50.3, 116.12; 317—112